(12) United States Patent
Dunge

(10) Patent No.: US 11,909,237 B2
(45) Date of Patent: Feb. 20, 2024

(54) REVERSE POLARITY PROTECTED BATTERY MODULE

(71) Applicant: POLARIUM ENERGY SOLUTIONS AB, Kista (SE)

(72) Inventor: Andreas Dunge, Kista (SE)

(73) Assignee: POLARIUM ENERGY SOLUTIONS AB, Kista (SE)

( * ) Notice: Subject to any disclaimer, the term of this patent is extended or adjusted under 35 U.S.C. 154(b) by 382 days.

(21) Appl. No.: 17/432,296

(22) PCT Filed: Feb. 22, 2019

(86) PCT No.: PCT/EP2019/054460
§ 371 (c)(1),
(2) Date: Aug. 19, 2021

(87) PCT Pub. No.: WO2020/169209
PCT Pub. Date: Aug. 27, 2020

(65) Prior Publication Data
US 2022/0247189 A1    Aug. 4, 2022

(51) Int. Cl.
*H02J 7/00* (2006.01)
*H02H 11/00* (2006.01)

(52) U.S. Cl.
CPC ......... *H02J 7/0034* (2013.01); *H02H 11/003* (2013.01); *H02J 7/007* (2013.01); *H02J 7/0042* (2013.01); *H02J 7/00308* (2020.01)

(58) Field of Classification Search
CPC ........ H02J 7/007; H02J 7/0042; H02J 7/0034; H02J 7/00308
See application file for complete search history.

(56) References Cited

U.S. PATENT DOCUMENTS

| 2011/0193409 A1 | 8/2011 | Hara et al. |
| 2014/0239884 A1 | 8/2014 | Koike |

(Continued)

FOREIGN PATENT DOCUMENTS

| EP | 1429439 A1 | 6/2004 |
| JP | H06-348350 A | 12/1994 |

(Continued)

OTHER PUBLICATIONS

Japanese Office Action for Application No. 2021-547862 dated Jan. 13, 2023.

(Continued)

*Primary Examiner* — Robert Grant
(74) *Attorney, Agent, or Firm* — MOSER TABOADA

(57) ABSTRACT

The present disclosure relates to a battery module (300) comprising a first charging terminal (203) and a second charging terminal (204) for connecting the battery module to an external power source (250) or a load (350). The battery module includes a battery cell arrangement (210) which has a maximum charge voltage and has a first terminal (201) and a second terminal (202). The first terminal (201) is connected to the first charging terminal (203). The battery module includes also a switch arrangement including at least a first switching device (240) connected between the second terminal (202) of the battery cell arrangement and the second charging terminal (204). The first switching device is operable to switch to a current passing state for discharging the battery module. The battery module also includes a controller (220) configured to control operation of the switch arrangement. Upon detection of a reverse polarity connection of the external power source at the first and second charging terminals, the controller is configured to operate the first switching device to switch to a current blocking state. The first switching device has a blocking voltage equal (Continued)

or higher than at least twice the maximum charge voltage of the battery cell arrangement.

19 Claims, 3 Drawing Sheets

(56) References Cited

U.S. PATENT DOCUMENTS

| | | |
|---|---|---|
| 2015/0239363 A1 | 8/2015 | Brockerhoff et al. |
| 2015/0270731 A1 | 9/2015 | Adelmann et al. |
| 2020/0028368 A1* | 1/2020 | Nook .................... H02J 7/0016 |

FOREIGN PATENT DOCUMENTS

| | | |
|---|---|---|
| JP | H08-308116 A | 11/1996 |
| JP | 2014168352 A | 9/2014 |
| WO | WO-03071648 A2 | 8/2003 |
| WO | WO-2017/211418 A1 | 12/2017 |

OTHER PUBLICATIONS

International Search Report for Application No. PCT/EP2019/054460 dated Nov. 26, 2019.
Written Opinion of the International Preliminary Examining Authority for Application No. PCT/EP2019/054460 dated Jan. 14, 2021.
International Preliminary Report on Patentability for Application No. PCT/EP2019/054460 dated Jun. 9, 2021.

* cited by examiner

REVERSE POLARITY PROTECTED BATTERY MODULE

TECHNICAL FIELD

The present disclosure relates to the field of chargeable battery modules. In particular, the present disclosure relates to reverse polarity protection of a battery module, for example a battery module acting as a backup battery at a wireless communication base station.

BACKGROUND

Rechargeable batteries are employed in different settings, for example in electric cars or as backup power sources in stationary devices such as base stations for mobile communication. Rechargeable batteries include a collection of cells (or cell assemblies) which are the electrochemical units containing the electrodes and the electrolyte. An example of rechargeable battery cells may be Lithium-ion (Li-ion) based cells. In many cases, it is desirable to charge the cells of the batteries both quickly and efficiently when a main power supply is available, such as via the line power (or mains power). For this purpose, the batteries, in the form of a battery pack or a battery module for example, may typically be connected to an external power source, such as the mains power, or to a charger.

For a proper charging of the battery module, a terminal of the battery module should be connected to a terminal of the power source having the same electric polarity. There is however always a risk that a wrongful connection of the power source with the battery module is established such that terminals of opposite electric polarities are connected to each other. Such reverse polarity connection could generate considerable damages to the cells of the battery module. The battery module should therefore be protected from such reverse polarity connection.

For example, reverse polarity protection may be obtained by the use of a diode connected between the terminals of the battery module. In the event of a reverse (or wrong) polarity connection of the power source at the terminals of the battery module, the diode shorts the terminals of the battery module together, thereby protecting the cells of the battery module. However, the diode may suffer from overheating, in particular in high power applications, and it may also complicate the manufacturing of the battery module. In other words, there is still a need for improved solutions.

SUMMARY

An object of the present disclosure is to provide a technology that addresses at least some of the above concerns. This and other objects, which will become apparent in the following, are accomplished by a battery module as defined in the independent claim. Preferable embodiments are defined in the dependent claims.

According to some embodiments, there is provided a battery module comprising a first charging terminal and a second charging terminal for connecting the battery module to an external power source or a load. The battery module comprises a battery cell arrangement having a maximum charge voltage and having a first terminal and a second terminal, wherein the first terminal is connected to the first charging terminal. The battery module comprises also a switch arrangement and a controller configured to control operation of the switch arrangement.

The switch arrangement includes at least a first switching device connected between the second terminal of the battery cell arrangement and the second charging terminal. The first switching device is operable to switch to a current passing state for discharging the battery module, thereby providing power to the load.

The controller is configured to, upon detection of a reverse polarity connection of the external power source at the first and second charging terminals, operate the first switching device in a current blocking state. The first switching device has a blocking voltage equal or higher than at least twice the maximum charge voltage of the battery cell arrangement.

In the present embodiments, the controller (which may also be referred to as a battery management system of the battery module) is configured to operate the switch arrangement such that the first switching device is (i) in a current blocking mode upon detection of a reverse polarity connection of an external power source at the first and second charging terminals of the battery module and (ii) in a current passing mode for discharging the battery module. In other words, the first switching device has two distinct functions. The first switching device does not only serve as a switch for switching to a discharging mode (from e.g. a charging mode) when there is a need of providing power to the load, but it also functions as a protective device (or protective component) to protect the battery module upon detection of a reverse polarity connection.

With respect to its function as a protective component against reverse polarity connection, the first switching device has a blocking voltage which is at least twice the maximum charge voltage of the battery cell arrangement. The blocking voltage represents the voltage that the first switching device is capable to block under reverse bias conditions before it starts conducting a current, for example because it reaches the avalanche regime in the case of a transistor. The blocking voltage may also be referred to as the breakdown voltage. More specifically, the first switching device is designed to withstand the voltage applied between the second terminal of the battery cell arrangement and the second charging terminal when there is a reverse polarity connection of the power source.

The maximum charge voltage $V_{max}$ of the battery cell arrangement refers (or corresponds) to the maximum voltage at which the battery cell arrangement may be charged before it could be damaged. Such maximum charge voltage may depend on the type of cells and the arrangement of the cells. The maximum charge voltage $V_{max}$ may be determined from supplier specifications about the cells. For the purpose of illustration, although the present disclosure is not limited to such a specific example, the maximum charge voltage $V_{max}$ may be equal to 60 V. For charging a battery module having such a specification, i.e. a battery module with a battery cell arrangement characterized by a maximum charge voltage $V_{max}$ of 60 V, the battery module may be connected to a power source or a charger configured to deliver a nominal voltage being equal to, or slightly higher than, the maximum charge voltage $V_{max}$ of the battery cell arrangement, i.e. 60 V in the present example.

In the absence of any protective device or protective mechanism, connecting such a power source or charger at the charging terminals of the battery module is equivalent to connecting a −60 V battery in parallel with a +60 V battery. Each of the batteries (the battery cell arrangement on one side and the power source/charger on the other side) will then try to flow as much current as possible into the other battery in order to equalize their voltage levels. The power provided from the power source (or charger) to the battery cell arrangement will need to be dissipated as heat at the battery cell arrangement. This may however damage the cells of the battery cell arrangement and thereby deteriorate the battery module, in particular with e.g. Li-ion based cells having a rather low internal resistance.

It has herein been realized that, rather than using a separate protective device such as a diode connected between the first and second charging terminals of the battery module, the first switching device, whose primary function is to switch the battery module between a charging mode and a discharging mode, may be designed to withstand twice the maximum charging voltage, thereby preventing a current from flowing through the battery cell arrangement in case of a reverse polarity connection.

As mentioned above, upon detection of a reverse polarity connection (or at least upon receipt of an input signal indicating the possibility of a reverse polarity connection), the controller of the battery module is configured to operate the first switching device in a current blocking state. This means that the first switching device is operated to prevent current from flowing through it. Under reverse polarity connection, the first switching device arranged between the second terminal of the battery cell arrangement and the second charging terminal will be exposed to a reverse bias equal to two times the maximum charge voltage $V_{max}$, i.e. the voltage applied by the power source and the maximum charge voltage of the battery module, which then corresponds to −120V applied at the first switching device in accordance with the present example. By designing the first switching device such that it withstands a reverse voltage equal to at least twice the maximum charge voltage of the battery cell arrangement, the first switching device prevents (or at least limits) any electrical current from flowing through the battery cell arrangement, thereby protecting the battery module from damages if the power source or charger is wrongly connected at the first and second charging terminals.

The dual functionality of the first switching device allows for a less complex circuitry of the battery module. In particular, reverse polarity protection can be obtained without adding components for this specific purpose. This facilitates therefore also the manufacturing process of the battery module.

The present embodiments are also beneficial in that they do not require the use of a diode as a protective device, which may be subject to overheating, in particular for high power applications.

It will be appreciated that, for some applications, a battery module may need to be connected in parallel with another battery module. With the battery module according to the present embodiments, protection is also provided in case terminals of opposite polarities are connected between the two battery modules. The principle of operation and/or the protection mechanism is then the same as if a power supply is wrongly connected to the battery module.

In the present application, a current passing state (or current passing mode) refers to a state of operation of the first switching device in which an electrical current may pass through the first switching device. A current passing state may for example be represented by a switch, or a transistor, being closed (i.e. an electrical current may pass through the switch or the switch is electrically conducting).

Similarly, a current blocking state (or current blocking mode) refers to a state of operation of the first switching device in which no electrical current, or at least almost no electrical current, may pass through the first switching device. This corresponds generally to the state of the switching device for which a voltage applied upon the switching device is lower than its blocking voltage. This may also correspond to the case of a transistor under reverse bias conditions. A blocking current state may for example be represented by a switch, or a transistor, being open (i.e. no electrical current may pass through the switch).

In general, it will be appreciated that, in the present disclosure, two terminals or two components connected to each other may for example be directly connected to each other or indirectly connected to each other. The terminals or components may for example be connected to each other via one or more other components.

The load may for example be a communication module of a wireless base station.

Further, it will be appreciated that, in the present embodiments, the battery cell arrangement may comprise lithium and/or lithium ions. The battery cell arrangement may for example comprise at least one lithium-ion based battery or cell. However, the embodiments of the present disclosure are not limited to this technology and other types of rechargeables cells, based on a different electrochemistry, may be used.

According to an embodiment, the first switching device of the switch arrangement may be a transistor having a (certain) voltage rating and the blocking voltage may correspond to the voltage rating of the transistor.

The first switching device may for example be a metal oxide semiconductor field effect transistor (MOSFET) with an optional diode connected in parallel. The purpose of the optional diode connected in parallel is to protect the transistor. The diode may be referred to as a freewheeling diode. In some embodiments, the first switching device may be a relay switch or another type of transistor.

The voltage rating of the MOSFET may represent the maximum voltage that the MOSFET operating in a current blocking state, i.e. under reverse bias conditions, may withstand before entering an avalanche mode, i.e. the maximum voltage before the transistor start conducting current under reverse bias.

According to an embodiment, the controller may be configured to control operation of the switch arrangement in response to an input signal provided by a sensor of the battery module. The controller may for example be configured to operate the first switching device to switch between a current passing state and a current blocking state, or vice versa, upon detection or reception of a signal provided from the sensor of the battery module. In a first scenario, the input signal may indicate that a load is connected at the first and second charging terminals so that the controller operates the first switching device in a current passing state for providing power to the load, i.e. for discharging the battery cell arrangement. In a second scenario, the input signal may indicate the occurrence (or at least the possibility) of a reverse polarity connection of a charger at the first and second charging terminals so that the controller operates the first switching device in a current blocking state for preventing a current from flowing through the battery cell arrangement. The controller is therefore configured to govern the first switching device in order to provide its dual functionality.

The battery module may be equipped with one or more sensors dedicated to the detection of an occurrence of a reverse polarity connection of a power source at the first and second charging terminals.

According to an embodiment, the sensor may include a resistance connected in series with the first switching device and the input signal may include at least one of a voltage and/or a current exceeding a threshold (upon said resistance). Although the present embodiment relies on the use of a resistance as a sensor, other types of sensors may be used. The resistance may be a resistor but may also be any internal resistance of an electrical component.

An increase of the current upon the resistance (e.g. detected by measuring a voltage) above a threshold would trigger a protective mechanism to stop this current. In particular, the controller (or another protective circuit) may be configured to switch the first switching device in a current blocking mode such that the current stops flowing.

The resistance may therefore be a first sensor indicating that the battery module has been wrongly connected to an external power supply or another battery module. In this scenario, the increase of the current at the resistance occurs if the first switching device is conducting (i.e. in a current passing state).

The controller may then operate the switch arrangement, and in particular the first switching device (so that it switches to a current clocking state), based on an input signal received from the sensor.

According to an embodiment, the sensor may include an optocoupler (or photocoupler or opto-isolator) connected between the first charging terminal and the second charging terminal. The optocoupler connected between the first and second charging terminals may be based on a diode emitting light if a power supply is connected wrongly at the first and second switching terminals. Detection of light within the optocoupler may then indicate, or confirm, to the controller the occurrence of a wrong connection of a power source with the battery module. It will be appreciated that the detection via the optocoupler may be performed when the first switching device is in a blocking mode.

In case an increase of current at the series-connected resistance is detected, the optocoupler may be used to verify whether the increase in current has occurred because of a wrong connection of the battery module to an external power source.

Although an optocoupler is disclosed as an example of sensor, any other type of sensor adapted to detect the occurrence of a reverse polarity connection at the first and second charging terminals may be used. The sensor may therefore in general be referred to as a sensor configured to detect the occurrence of a reverse polarity connection between the first and second charging terminals.

According to an embodiment, the controller may be configured to determine the occurrence of a reverse polarity connection of the external power source at the first and second charging terminals based on the input signal from one or more of the sensors arranged in the circuit. For example, if the input signal from a sensor including a resistance exceeds a threshold, the controller may determine that an external power source is incorrectly connected at the first and second charging terminals and it may thus control the switch arrangement such that the first switching device switches to a current blocking state in order to prevent damaging the battery cell arrangement.

According to an embodiment, the first switching device may have a blocking voltage of at least 2.5 times the maximum charge voltage. The present embodiment is beneficial in that it provides a wider range of protection. The blocking voltage may for example represent three (3) times the maximum charge current. A larger blocking voltage increases the security factor with regards to the operating range of protection provided by the first switching device. Such a larger voltage rating further allows the first switching device to protect the battery cell arrangement from reverse polarity connection of external power sources having a higher nominal voltage than actually required to charge the battery cell arrangement (i.e. a nominal voltage higher than $V_{max}$).

While protection of the battery module has been described in the above in case of a reverse polarity connection, it will in the following be described how the battery module can be operated to charge (or discharge) the battery cell arrangement incase the external power source is correctly connected to the battery module. For this purpose, the battery module may be equipped with a current limiting device based on a direct current to direct current (DC-DC) converter.

According to an embodiment, the battery module may further include a DC-DC converter having a first input terminal connected to the second charging terminal and an output terminal connected to the first terminal of the battery cell arrangement. The first switching device may be connected between the second terminal of the battery cell arrangement and a second input terminal of the converter. The switch arrangement may include a second switching device connected between the first input terminal and the second input terminal of the converter. The second switching device may be operable to bypass the converter.

In particular, the converter may be bypassed when the second switching device is in a current passing state.

The converter may for example be based on a step up converter (also called boost converter) or a flyback converter.

The converter may in particular be adapted to convert an input voltage at the input terminals of the converter to an output voltage at the output terminal of the converter, with the output voltage being higher than the input voltage.

According to an embodiment, the controller may be configured to operate the battery module, and in particular the switch arrangement, in at least one of a plurality of operating modes in addition to the reverse polarity connection mode already described in the preceding embodiments.

In a discharging mode, both the first switching device and the second switching device may be in a current passing state such that the battery cell arrangement is discharged and power is provided to a load connected at the first and second charging terminals of the battery cell arrangement. In a first charging mode, both the first switching device and the second switching device may be in a current blocking state such that the battery cell arrangement may be charged by a power source (or charger) connected at the first and second charging terminals. In this first charging mode, some of the current will flow through the DC-DC converter such that the charging is performed under current limiting conditions in the sense that the current flowing to the battery cell arrangement is limited. In a second charging mode, the first switching device is in a current blocking state and the second switching device is in a current passing state. The second charging mode corresponds to a situation in which the DC-DC converter is bypassed such that the charging is performed without current limitation.

According to an embodiment, the controller may be configured to operate the first switching device of the switch arrangement to switch to a current blocking state and the second switching device to switch to a current blocking state upon detection that a charge level of the battery cell arrangement is below a minimum charge voltage. The detection of whether the charge level (or voltage level) at the battery cell arrangement is below a minimum charge voltage allows for the controller to protect the battery cell arrangement from damages caused by overdischarge of the battery cells. Such damages may affect the lifetime of the battery cell arrangement and its capacity to get completely charged in every charging cycle. The determination of whether the voltage level at the battery cell arrangement is below the minimum charge voltage by the controller may be based on input signals received from one or more sensors located at the battery cell arrangement.

As mentioned above, the DC-DC converter may be connected to limit a charge current of the battery cell arrangement when a voltage is applied at the first and second charging terminals and when the controller is configured to operate the battery module in the first charging mode.

The way the converter is connected (or coupled) allows for a limitation of the current provided from the external power source to the battery cell arrangement when a voltage is applied at the first and second charging terminals and the second switching device is operated in a current blocking state. A current passing between the second terminal of the battery cell arrangement and the second charging terminal may be restricted by the current allowed to pass through the input terminals of the converter.

The present embodiments including the DC-DC converter provides a protection of the battery module under charging conditions in that a too high charge currents may risk damaging the battery cell arrangement and/or deteriorating its performance. Limiting the charge current helps to protect the battery cell arrangement during charging. The charge current limiting provided by the converter may for example extend the lifetime of the battery cell arrangement.

The converter may be arranged such that, when an external source provides a voltage to the battery cell arrangement, a charge current of the battery cell arrangement corresponds to a sum of at least a current provided at (or passing between) the input terminals of the converter and a current provided at (or passing through) the output terminal of the converter. The charge current of the battery cell arrangement may for example be (or have the same value as) a sum of the current provided at the input terminals of the converter and a current provided at the output terminal of the converter.

The converter may be arranged such that, when an external power source provides a voltage to the battery cell arrangement, the voltage applied at the first and second charging terminals is divided (or split) between at least the battery cell arrangement and the input terminals of the converter. It will be appreciated that the voltage applied at the charging terminals may for example be split between more components than the battery cell arrangement and the input terminals of the converter.

According to an embodiment, the controller may be configured to operate the second switching device in a current blocking state for not bypassing the converter in response to detection of a condition for charging the battery module under current limiting conditions.

According to an embodiment, the condition for charging the battery module under current limiting conditions may include at least one of: (i) a charge current of the battery cell arrangement exceeding a threshold, (ii) a temperature at the battery cell arrangement exceeding a threshold, (iii) a voltage at a cell in the battery cell arrangement exceeding a threshold, and (iv) a voltage at a cell in the battery cell arrangement being below a threshold. For this purpose, the battery module may be equipped with different types of sensors such as for example a temperature sensor located at one or more of the cells of the battery cell arrangement.

The detected condition may indicate to the controller that the battery cell arrangement is vulnerable to high charge currents. Charging the battery module under current limiting conditions may then be appropriate so that the risk of damaging the battery cell arrangement is reduced. Detecting that a voltage at a cell exceeds a certain threshold may for example indicate that the cell may risk getting overcharged. Detecting that a voltage at a cell is below another threshold may for example indicate that the impedance of the cell is low and that the cell is vulnerable to high charge currents.

According to further embodiments of the present disclosure, there is provided a wireless communication base station comprising a communication module, connectors arranged to connect the communication module to a main power source for powering the communication module and a battery module as defined in any one of the preceding embodiments. The battery module may be connected to the communication module as a backup power source.

The communication module may for example be adapted for wireless communication using one or more antennas. The base station may for example be a base transceiver station (BTS), a Node B or an Evolved Node B (eNB).

The controller of the battery module may be configured such that, if the main power source is unavailable (i.e. unavailable for powering the communication module), then the controller controls the battery cell arrangement of the battery module in a discharge mode for powering the communication module. The controller may perform the control of the battery cell arrangement via the switch arrangement of the battery module. The controller may for example be a battery management system (BMS).

The controller (e.g. a BMS) may be configured such that, if the main power source is available and connected properly at the first and second charging terminals of the battery module (i.e. available for powering the communication module), then the controller controls the battery cell arrangement of the battery module in a charging mode using the main power source.

However, if the main power source is not connected properly at the first and second charging terminals of the battery module, then the controller is configured to switch the first switching device in a current blocking mode, thereby disenabling the possibility of charging the battery cell arrangement. An alert (e.g. in the form of a sound, a visual signal or a display message) may be sent from the controller to inform a user of the battery module that a wrong connection has been established.

The main power source may be a direct current power source or an alternate current power source. In case the main power source is an alternate current power source, the base station may for example comprise a rectifier for rectifying the alternate current such that a direct current may be provided for charging the battery module.

It is noted that other embodiments using all possible combinations of features recited in the above described embodiments may be envisaged. Thus, the present disclosure also relates to all possible combinations of features mentioned herein. Any embodiment described herein may be combinable with other embodiments also described herein, and the present disclosure relates to all combinations of features.

BRIEF DESCRIPTION OF THE DRAWINGS

The above, as well as additional objects, features and advantages of the present invention, will be better understood through the following illustrative and non-limiting detailed description of embodiments of the present disclosure. Reference will be made to the appended drawings, on which.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION OF EMBODIMENTS

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
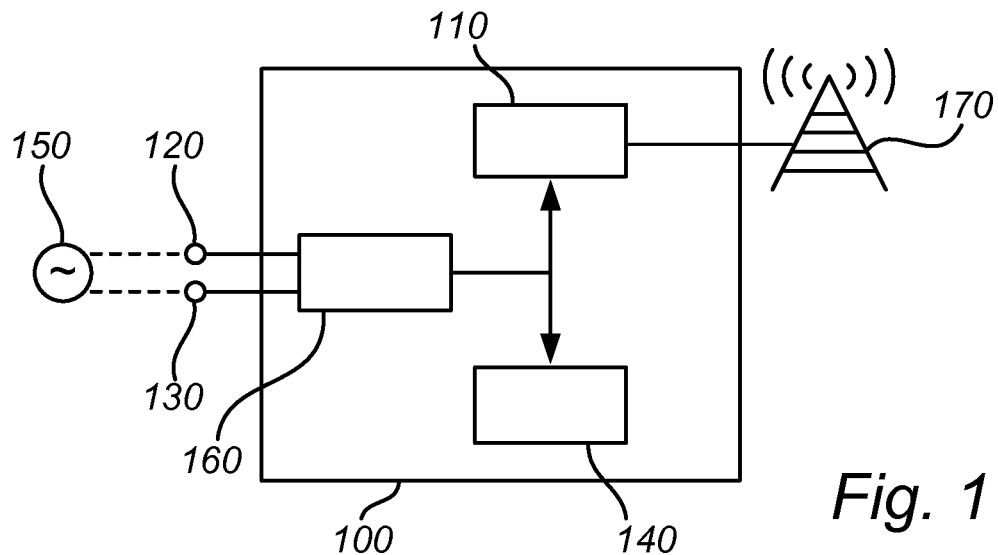
FIG. 1 illustrates an overview of a mobile communication base station, according to an embodiment.

FIG. 1 is an overview of a mobile communication base station 100, according to an embodiment. The base station 100 may for example be a base transceiver station (BTS), a Node B or an Evolved Node B (eNB).

The base station 100 comprises a communication module 110, connectors 120 and 130, and a battery module 140 (or battery pack, or battery circuit). The connectors 120 and 130 are arranged to connect the communication module 110 to a main power source 150 for powering the communication module 110. The main power source 150 may for example be an alternate current power source such as line power (or mains power), or a direct current power source such as one or more solar panels. If the main power source 150 is an alternate current power source, the base station 100 may for example comprise one or more rectifiers 160 for providing direct current to the communication module 110 and/or the battery module 140.

The communication module 110 is adapted to perform wireless communication via one or more antennas 170. The wireless communication may for example be performed via signals in the radio frequency domain.

The battery module 140 is connected to the communication module 110 as a backup power source in case the main power source 150 is temporarily unavailable. As long as the main power source 150 is available, it may be employed to power the communication module 110 and to charge the battery module 140. If the power source becomes unavailable, for example due to a general power failure in the area or due to a local malfunction, the battery module 140 is employed to power the communication module 110. The battery module 140 may be employed as a power source until it has been discharged or until the main power source 150 becomes available again.

At installation of the battery module 140 in the base station 100, a terminal of the battery module 140 should be connected with a terminal of the power source 150, or rather the rectifier 160 as the case may be, having the same electric polarity (negative terminals connected to one another and positive terminals connected to one another). However, there is always a risk that a reverse polarity connection is made, which would then be detrimental for the battery module. Solutions for protecting the battery module against such reverse polarity connection are needed.

Figure 2:
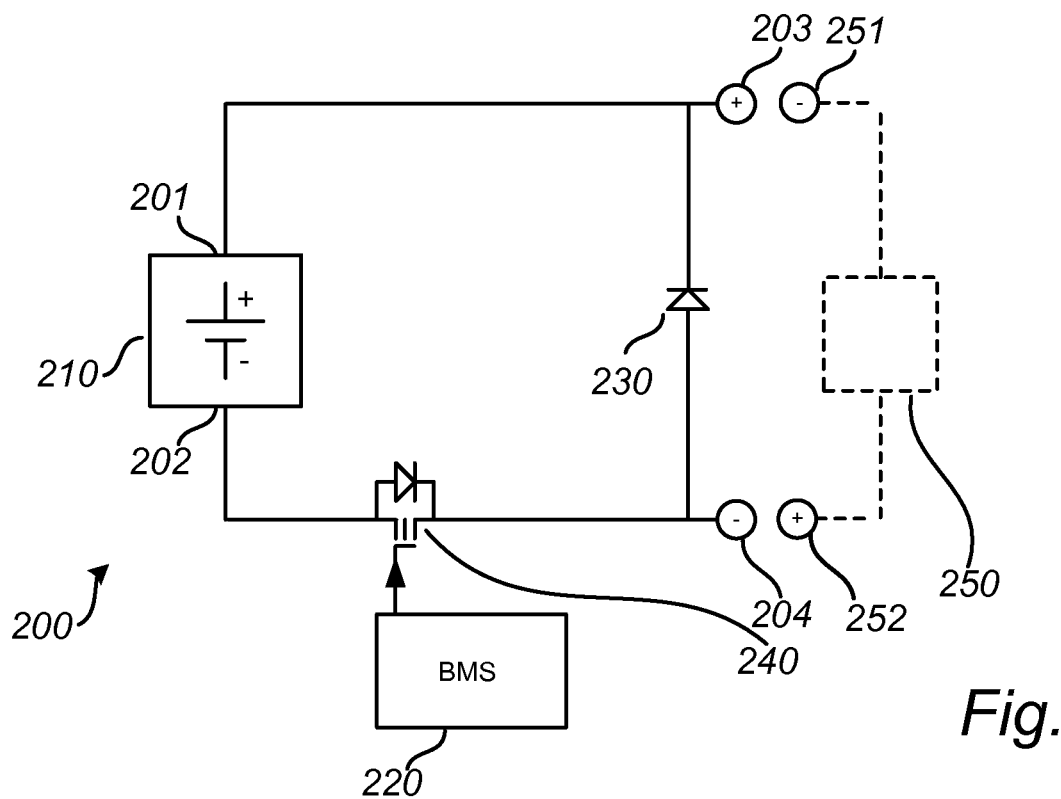
FIG. 2 shows a battery module in which a diode protects the battery cell arrangement from reverse polarity connection of the external power source.

With reference to FIG. 2, a battery module in which a diode is used as a protective device against a reverse polarity connection is described.

FIG. 2 shows a battery module 200 having a battery cell arrangement 210, a first charging terminal 203 and a second charging terminal 204 at which a power source 250 may be connected. For the purpose of illustration, the first charging terminal 203 is connected to the positive pole 201 of the battery cell arrangement 210 and the second charging terminal 204 is connected to the negative pole 202 of the battery cell arrangement 210.

The power source 250 may have a first terminal 251 of negative polarity and a second terminal 252 of positive polarity. As illustrated in FIG. 2, a reverse polarity connection may be established in that the first terminal 251 of the power source 250 is connected to the first terminal 203 of the battery module and the second terminal 252 of the power source 250 is connected to the second charging terminal 204.

The battery module 200 shown in FIG. 2 includes a first switching device 240, e.g. a transistor with a diode connected in parallel, which is controlled by a controller 220, e.g. a battery management system (BMS), to switch between a current blocking state and a current passing state. The first switching device is typically used to switch from (i) a charging mode, in which the battery cell arrangement 210 may be charged by the external power source 250 (in case it is correctly connected), to (ii) a discharging mode, in which the battery cell arrangement 210 may be discharged, for example to provide power to a load (not shown in FIG. 2). In the charging mode, the first switching device 240 may be in the current blocking state while it is in the current passing mode in the discharging mode.

The battery module 200 includes also a diode 230 arranged between the first charging terminal 203 and the second charging terminal 204 for protecting the battery cell arrangement 210 from reverse polarity connection of the external power source 250 at the charging terminals 203, 204, such as shown in FIG. 2.

In the battery module 200 shown in FIG. 2, in the occurrence of a reverse polarity connection of the external power source 250, the diode connects (or short circuits) the first charging terminal 203 with the second charging terminal 204 such that the battery cell arrangement 210 does not "feel" that the external power source has been connected.

Such a solution requires however the need of a separate diode 230, thereby complicating the manufacturing of the battery module. In addition, the diode 230 may be subject to overheat in particular for high power applications. There is therefore a need for other solutions.

Figure 3:
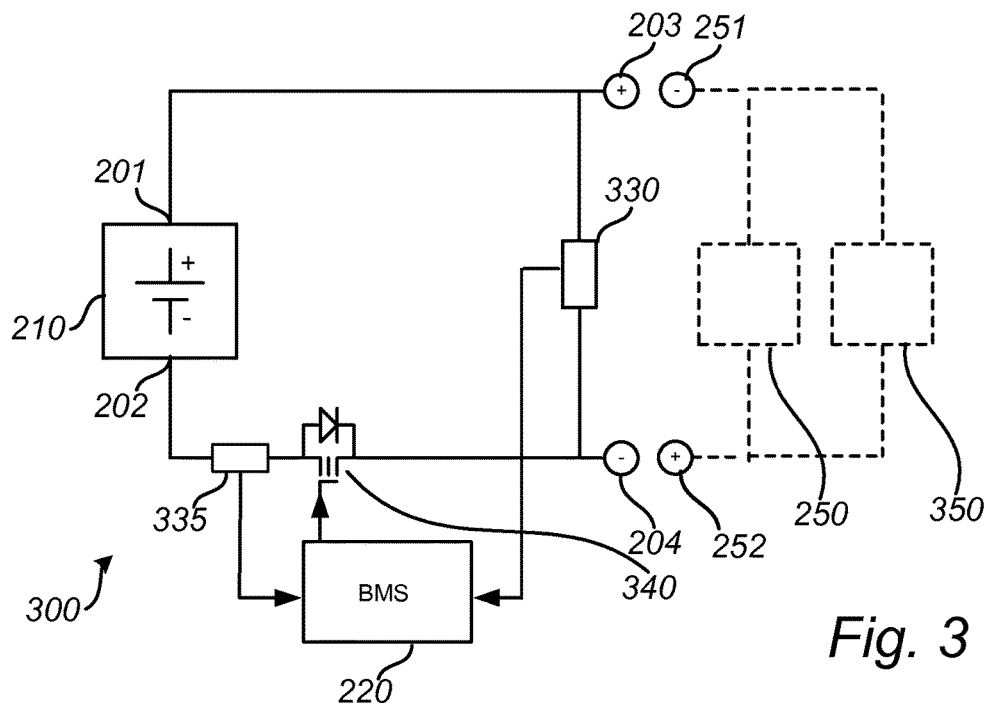
FIG. 3 shows a battery module including a first switching device with a dual functionality for protecting the battery cell arrangement from reverse polarity connection of the external power source.

With reference to FIG. 3, a battery module in accordance with an embodiment of the present disclosure is disclosed.

FIG. 3 shows a battery module 300 which is equivalent to, or at least based on, the structure/circuitry of the battery module 200 described with reference to FIG. 2 except that it does not include a diode between the first charging terminal 203 and the second charging terminal 204 of the battery module 300. Further, the first switching device 340 is a switching device having a blocking voltage which is equal or higher than at least twice the maximum charge voltage of the battery cell arrangement. The first switching device may for example be a MOSFET with a diode connected in parallel.

In comparison to the first switching device 240 described with reference to FIG. 2, the first switching device 340 of the battery module 300 shown in FIG. 3 has a dual functionality. More specifically, the first switching device 340 may be operated (i) in a current passing state for discharging the battery cell arrangement 210, thereby providing power to a load 350 connected between the first and second charging terminals 203 and 204, or (ii) in a current blocking state, for example in case an external power source 250 is connected wrongly at the first and second charging terminals 203 and 204.

The voltage rating of the MOSFET, i.e. the maximum voltage which can be blocked by the MOSFET 340 under reverse bias conditions may be at least twice the maximum charge voltage of the battery cell arrangement 210. With such a condition, the first switching device or MOSFET 340 will be able to block (or at least restrict) any current from flowing to the battery cell arrangement 210. In particular, it will be appreciated that, assuming that the external power source 250 is designed to provide a nominal voltage of 60 V, which is suitable for charging a battery cell arrangement having a maximum charge voltage of 60 V, a voltage of −120 V will be applied between the first terminal 202 of the battery cell arrangement 210 and the second charging terminal 204 of the battery module 300 in case the power source 250 is wrongly connected at the first and second charging terminals 203 and 204 of the battery module 300. The first switching device 340 designed with a blocking voltage of at least twice the maximum charge voltage of the battery cell arrangement would then be able to withstand such a voltage when it is in a current blocking state, as controlled by the controller 220.

FIG. 3 further shows a sensor 330 including an optocoupler connected between the first charging terminal 203 and the second charging terminal 204. The sensor 330 may be used to detect, or verify, the occurrence of a reverse polarity connection at the first and second charging terminals. The sensor 330 may then be configured to communicate a signal to the controller 220 of the battery module 340. The measurement with the optocoupler 330 may be possible when the first switching device 340 is in a current blocking mode.

In the occurrence of a reverse polarity connection of the external power source 250 at the charging terminals 203 and 204 when the first switching device is in a current passing mode, a voltage and/or a current passing through the circuit may be detected at a resistance 335. If this current exceeds a threshold, the controller 220 will determine to operate the first switching device 240 in a current blocking state. The optocoupler 330 may then be used to verify that the increase in current has occurred because of a reverse polarity connection of a power source (or another battery module) at the first and second charging terminals.

In some embodiments, the voltage rating of the first switching device 340 may also be at least 2.5 times the maximum charge voltage of the battery cell arrangement 210. In the present example, the voltage rating of the first switching device 340 may be at least 150 V. Using a first switching device having an even higher voltage rating increases the operating range over which it may efficiently protect the battery cell arrangement 210 from reverse polarity connection. Further, this allows also to protect the battery module in case of reverse polarity connection of external power source having even higher nominal voltages, such as up to 90V in the present case.

Figure 4:
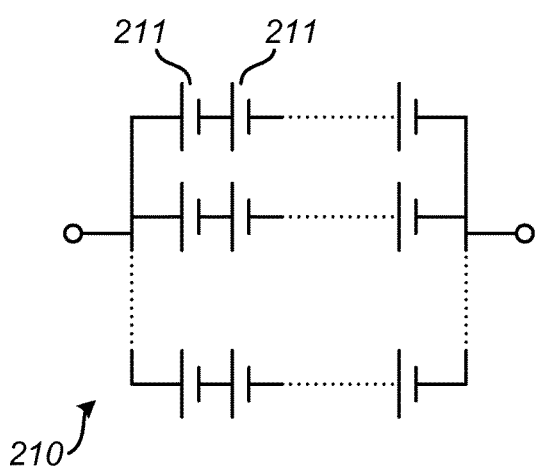
FIG. 4 illustrates an example of a battery cell arrangement.

With reference to FIG. 4, an example of a battery cell arrangement is described.

FIG. 4 shows an example of a battery cell arrangement 210 comprising a plurality of battery cells 211 connected (or coupled) in series and/or in parallel to obtain a desired output voltage, a desired output current capacity, and/or a desired energy storage capacity. Embodiments may also be envisaged in which the battery cell arrangement 210 comprises a single cell 211.

Figure 5:
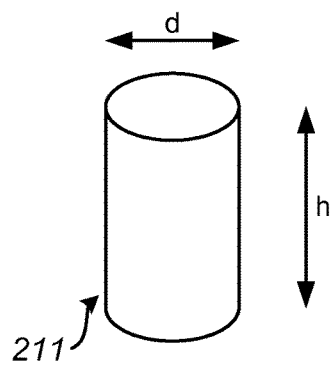
FIG. 5 illustrates a battery cell of a battery cell arrangement such as the battery cell arrangement shown in FIG. 4.

With reference to FIG. 5, an example of a battery cell is described.

FIG. 5 shows an example of a battery cell 211 such as a cylindrical cell with height h and diameter d. As an example, the height h of a battery cell 211 may be 65 mm and the diameter d may be 18 mm. The voltage of a cell 211 may for example be in the range 2.2 V-3.7 V. The individual cells 211 may be stacked to form a single battery cell arrangement 210 which may for example be rectangular. Embodiments may also be envisaged in which the battery cells 211 have different shapes than cylindrical, such as a rectangular shape.

The battery cells 211 may for example comprise Lithium (Li) ions. The battery cells 211 may for example be Li-ions based cells, but other battery technologies may be used.

As an example, the battery cell arrangement 210 may include P strings of cells 211 connected in parallel, each string comprising S cells 211 connected in series. The integer P may be chosen to provide a suitable output voltage of the battery cell arrangement 210. The integer S may be chosen such that the battery cell arrangement 210 is able to provide a suitable output current.

Figure 6:
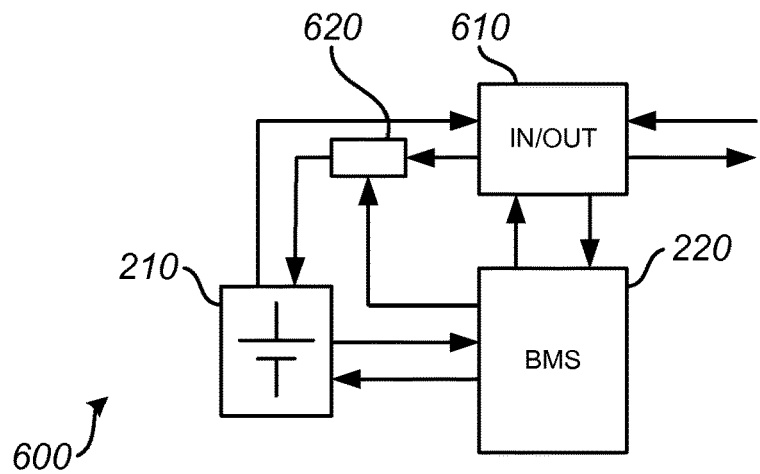
FIG. 6 is an overview of a battery module for use in a base station as shown in FIG. 1, according to an embodiment.

With reference to FIG. 6, an embodiment of a battery module in accordance with the present disclosure is described.

FIG. 6 is an overview of a battery module 600, which may for example be equivalent to, or at least be based on the battery modules described in the preceding embodiments with reference to FIGS. 1-5.

The battery module 600 includes a battery cell arrangement 210 (or battery) arranged to store power. An input/output section 610 provides input power to the battery module 600 during charging of the battery cell arrangement 210, and provides output power from the battery module 600 during discharging of the battery cell arrangement 210. A charge current limiting device 620 including a direct current to direct current converter may be arranged in the circuitry to limit, if needed, a charge current when charging the battery cell arrangement 210.

A controller or BMS 220 monitors the battery cell arrangement 210 (and/or other parts of the battery module 600). The controller 220 may for example monitor a signal provided by a sensor arranged at, or between, the first and second charging terminals in order to detect the occurrence of a reverse polarity connection of a power source at the first and second charging terminals. The controller may also be configured to monitor other sensors providing information about a charge current or a temperature of the battery cell arrangement 210, or voltages at the battery cells in the battery cell arrangement 210.

The controller (BMS) 220 may then be configured to control the input/output section 610 and the charge current limiter 620 such that the battery cell arrangement 210 is charged or discharged appropriately. If an imbalance between battery cells is detected during charging, the controller (BMS) 220 may try to even out this imbalance, limit a charge current by activating the charge current limiter 620 or even discontinue charging of the battery cell arrangement 210 to protect the battery cell arrangement 210. Rather than discontinuing the charging altogether when an undesirable condition is detected, it may be advantageous to be able to continue the charging in a charge current limited mode so as to be able to obtain a fully charged battery cell arrangement 210. This will be described in more detail in the following.

In addition, if a reverse polarity connection of a power source at the terminals of the input/output section 610 of the battery module 600 is detected, the controller 220 may be configured to switch a switching device of the circuitry in a current blocking mode, as described in the preceding embodiments.

Figure 7:
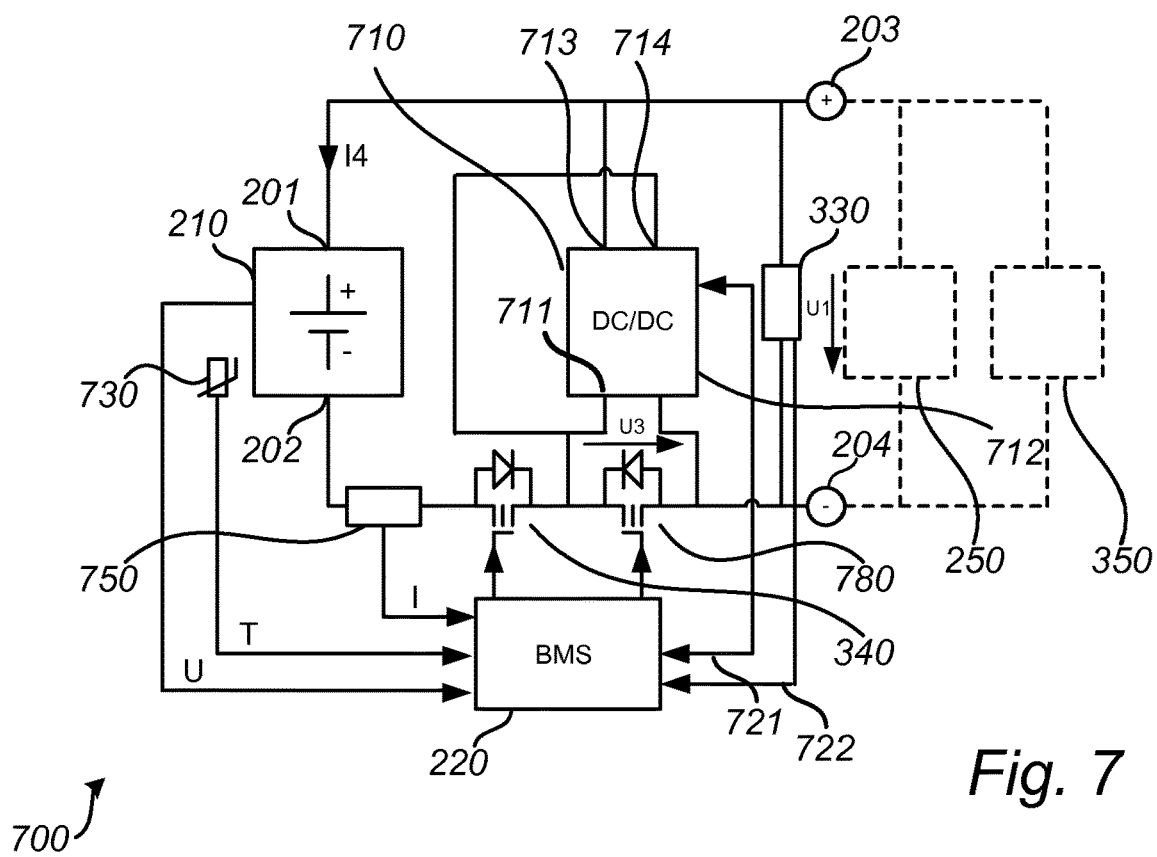
FIG. 7 illustrates an embodiment of a battery module equipped with a DC-DC converter and a second switching device, in accordance with an embodiment.

With reference to FIG. 7, a battery module 700 in accordance with an embodiment of the present disclosure is described. The operation of such a battery module will also be described in more detail in the following.

FIG. 7 shows an overview of a battery module 700 which may be equivalent to, or at least be based on, the battery module described with reference to FIG. 3, except that it also includes a charge current limiting device and a number of sensors.

In the present example, the external power source 250 may be the main power source 150 powering the base station 100, described with reference to FIG. 1. If the main power source 150 is an alternative current power source, the rectifier 160, described with reference to FIG. 1, may provide a direct current to the charging terminals 203 and 204 of the battery module 700.

The direct current to direct current power converter (DC-to-DC power converter) 710 has two input terminals 711 and 712 and two output terminals 713 and 714. The DC-to-DC converter is arranged to convert (or step up) a voltage U3 applied at its input terminals 711 and 712 to a higher voltage at its output terminals 713 and 714. The DC-to-DC converter 710 may for example be a step up converter 710 (also called boost converter) or a flyback converter. The DC-to-DC converter 710 may for example be a switched-mode power supply (SMPS).

The first terminal 201 of the battery cell arrangement 210 is connected to the first charging terminal 203. An input terminal 711 of the converter 710 (i.e. the input terminal 711 through which current is to enter the input/supply side of the converter 710) is connected to the second terminal 202 of the battery cell arrangement 210 and the other input terminal 712 of the converter 710 (i.e. the input terminal 712 through which current is to exit the input/supply side of the converter 710) is connected to the second charging terminal 204. An output terminal 713 of the converter 710 (i.e. the terminal 713 through which current is to exit the output/load side of the converter 710) is connected to the first terminal 201 of the battery cell arrangement 210 and the other output terminal 714 of the converter 710 (i.e. the terminal 714 through which current is to enter the output/load side of the converter) is connected to the input terminal 711 of the converter 710.

The purpose of the converter 710 and its connection is to limit a charge current at the first terminal 201 of the battery cell arrangement 210 in case it is needed. In other words, the converter 710 acts as the charge current limiter 620 described with reference to FIG. 6.

The battery module 700 also comprises a switch arrangement including the first switching device 340 and a second switching device 780 arranged for bypassing the converter 710. The controller (BMS) 220 is arranged to control the switch arrangement to operate each of the first switching device 340 and the second switching device 780 in either one of a current passing state and a current blocking state. The controller (BMS) 220 can operate the switch arrangement in at least one of the following modes.

In a discharging mode, the controller (BMS) 220 operates the first switching device 340 and the second switching device 780 to switch to a current passing state. Such mode allows the battery cell arrangement 210 to provide power to a load 350 connected to the first and second charging terminals 203 and 204 of the battery module 700.

In the occurrence of a reverse polarity connection of the external power source 250 at the first and second charging terminals 203 and 204, the controller (BMS) 220 operates the first switching device 340 to transition into a current blocking state in order to protect the battery cell arrangement 210 from any damages (as explained with regards to FIG. 3). The controller (BMS) 220 may control such transition of the first switching device 340 to a current blocking state based on an input signal received from a sensor 750 including a resistance indicating that the voltage or a current is above a threshold.

The battery module 700 may also include another sensor 330, such as e.g. an optocoupler, adapted to detect the occurrence of a reverse polarity connection at the first and second switching terminals 203 and 204.

If, however, the external power source 250 is correctly connected (such as shown in FIG. 7), the controller 220 may operate the switch arrangement in one of the following charging modes when a voltage U1 is applied at the first and second charging terminals 203 and 204.

In a first charging mode, the controller (BMS) 220 operates both the first switching device 340 and the second switching device 780 to switch to a current blocking state. The controller (BMS) 220 may monitor the battery cell arrangement 210 in order to detect when charge current limiting is needed. If a certain condition at the battery cell arrangement 210 is detected by the controller (BMS) 220, such as a too high charge current, a too high temperature, or certain voltage levels at the battery cells 211, the controller (BMS) 220 may control the second switching device 780 to switch to a current blocking state resulting in the converter 710 being activated to perform charge current limiting.

In a second charging mode, the controller (BMS) 220 operates the first switching device 340 to switch to a current blocking state and the second switching device 780 to switch to a current passing state such that the DC-DC converter 710 is bypassed. Such mode allows for an external power source 250 to provide power to the battery cell arrangement 210 in order to charge it. In this mode, the converter 710 is bypassed and the charge current is not subjected to charge current limiting. Instead, the charge current depends on the power source 250 and the impedance of the battery cell arrangement 210. The converter 710 may be switched off completely when it is bypassed, so as to save power.

The controller (BMS) 220 controls the transitioning of the first switching device 340 and the second switching device 780 between current passing state and current blocking state based on input signals received from different sensors comprised in the battery module 140. The voltage U at the battery cell arrangement 210, the charge current I (e.g. obtained by measuring a voltage over a resistor 750), and/or the temperature T (e.g. measured by a temperature sensor 730) may be employed as input by the controller (BMS) 220 for controlling the first switching device 340 and the second switching device 780. The controller (BMS) 220 may also provide control signals 721 for switching off (or deactivating) the converter 710 when it is not needed, so as to save power. The controller (BMS) 220 may also receive control signals 721 from the converter 710 indicating when charge current limiting is no longer needed, so that the second switching device 780 may be controlled to bypass the converter 710.

As long as the power source 250 (or the main power source 150) is available and correctly connected, the battery module 140 may be in a charging mode without current limiting (corresponding to the second charging mode) in which the battery cell arrangement 210 is charged. If, however, it is detected by the controller (BMS) 220 that the charge current I4 is above a threshold, the controller (BMS) 220 may control the switching arrangement such that the voltage over the battery cell arrangement 210 is split between the converter 710 and the battery cell arrangement 210, thereby transitioning into the first charging mode with current limiting. If the voltage over the input terminals 711 and 712 of the converter 710 drops below a threshold, the converter 710 controls the second switching device 780 to transition to a current passing state such that the converter 710 is bypassed, thereby transitioning the battery module 700 into the second charging mode without charge current limiting again.

Still referring to the embodiment shown in FIG. 7, further details and alternatives about the DC-DC converter, its possible connections in the battery module and its functionality may be of the type described in the International patent application PCT/EP2016/063144 by the same applicant. Accordingly, the content of International patent application PCT/EP2016/063144 is herein incorporated in its entirety.

It will be appreciated that the present invention is by no means limited to the preferred embodiments described above. On the contrary, many modifications and variations are possible within the scope of the appended claims. For example, although the battery module has been described in the context of a wireless communication base station, it will be appreciated that the battery module may be employed in more or less any device or system powered by a rechargeable battery, as long as voltage levels, power levels etc. of the components of the battery module are selected appropriately. For example, the battery module may be employed at core sites or switch sites of a telecommunication infrastructure. It will also be appreciated that the particular voltage levels, current levels and power levels described above are examples, and that embodiments of the present disclosure may be envisaged for more or less any voltage levels, power levels etc.

It will also be appreciated that the circuits described in the above may for example comprise additional components than those described.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. The mere fact that certain measures are recited in mutually different dependent claims does not indicate that a combination of these measures cannot be used to advantage. Any reference signs in the claims should not be construed as limiting the scope.

The invention claimed is:

1. A battery module comprising:
   a first charging terminal and a second charging terminal for connecting the battery module to an external power source for charging of the battery module or a load for providing power to said load;
   a battery cell arrangement having a maximum charge voltage and having a first terminal and a second terminal, wherein the first terminal is connected to the first charging terminal,
   a switch arrangement including at least a first switching device connected between the second terminal of the battery cell arrangement and the second charging terminal, said first switching device being operable to switch the battery module between a discharging mode in which power is provided to said load and a charging mode in which power is provided from the external power source to the battery cell arrangement, the first switching device being in a current passing state for discharging the battery cell arrangement in the discharging mode, and
   a controller configured to control operation of the switch arrangement between said discharging mode and said charging mode, wherein, upon detection of a reverse polarity connection of the external power source at the first and second charging terminals, the controller is configured to operate the first switching device to switch to a current blocking state,
   wherein the first switching device has a blocking voltage equal to or higher than, at least twice the maximum charge voltage of the battery cell arrangement, and
   wherein the controller is configured to control operation of said switch arrangement in response to an input signal provided by a sensor of said battery module.

2. The battery module of claim 1, wherein the first switching device is a transistor having a voltage rating and the blocking voltage is the voltage rating of the transistor.

3. The battery module of claim 1, wherein the sensor includes a resistance connected in series with the first switching device and said input signal includes at least one of a voltage and/or a current exceeding a threshold.

4. The battery module of claim 1, wherein the sensor includes an opto coupler connected between the first charging terminal and the second charging terminal.

5. The battery module of claim 1, wherein the controller is configured to determine the occurrence of a reverse polarity connection of the external power source at the first and second charging terminals based on said input signal.

6. The battery module of claim 1, wherein the first switching device has a blocking voltage of at least 2.5 times the maximum charge voltage.

7. The battery module of claim 1, further including:
   a direct current to direct current converter having a first input terminal connected to the second charging terminal and an output terminal connected to the first terminal of the battery cell arrangement,
   wherein said first switching device is connected between the second terminal of the battery cell arrangement and a second input terminal of the converter,
   wherein the switch arrangement includes a second switching device connected between the first input terminal and the second input terminal of the converter, said second switching device being operable to bypass said converter.

8. The battery module of claim 7, wherein the controller is configured to operate the battery module in at least one of:

said discharging mode in which the first switching device is in a current passing state and the second switching device is in a current passing state, a first charging mode in which the first switching device is in a current blocking state and the second switching device is in a current blocking state, and a second charging mode in which the first switching device is in a current blocking state and the second switching device is in a current passing state.

9. The battery module of claim 7, wherein the controller is configured to operate the first switching device of the switch arrangement to switch to a current blocking state and the second switching device to switch to a current passing state upon detection that a charge level of the battery cell arrangement is under a minimum charge voltage.

10. The battery module of claim 7, wherein the converter is adapted to convert an input voltage at the input terminals of the converter to an output voltage at said output terminal of the converter, wherein the output voltage is higher than the input voltage.

11. The battery module of claim 8, wherein the converter is adapted to limit a charge current of the battery cell arrangement when a voltage is applied at the first and second charging terminals and the controller is configured to operate the battery module in the first charging mode.

12. The battery module of claim 7, wherein the controller is configured to operate the second switching device to switch to a current blocking state for not bypassing the converter in response to detection of a condition for charging said battery module under current limiting conditions.

13. The battery module of claim 12, wherein said condition includes at least one of:

a charge current of the battery cell arrangement exceeding a threshold;

a temperature at the battery cell arrangement exceeding a threshold;

a voltage at a cell in the battery cell arrangement exceeding a threshold; and a voltage at a cell in the battery cell arrangement being below a threshold.

14. A wireless communication base station comprising:

a communication module, connectors arranged to connect the communication module to a main power source for powering the communication module; and a battery module as defined in claim 1, the battery module being connected to the communication module as a backup power source.

15. The wireless communication base station of claim 14, wherein the first switching device of the battery module is a transistor having a voltage rating and the blocking voltage is the voltage rating of the transistor.

16. The wireless communication base station of claim 14, wherein the sensor of the battery module includes a resistance connected in series with the first switching device and said input signal includes at least one of a voltage and/or a current exceeding a threshold.

17. The wireless communication base station of claim 14, wherein the sensor includes an opto coupler connected between the first charging terminal and the second charging terminal.

18. The wireless communication base station of claim 14, wherein the controller of the battery module is configured to determine the occurrence of a reverse polarity connection of the external power source at the first and second charging terminals based on said input signal.

19. The wireless communication base station of claim 14, wherein the first switching device of the battery module has a blocking voltage of at least 2.5 times the maximum charge voltage.

* * * * *